US006300882B1

(12) United States Patent
Inoue

(10) Patent No.: US 6,300,882 B1
(45) Date of Patent: Oct. 9, 2001

(54) VEHICLE-ONBOARD DSRC APPARATUS

(75) Inventor: Masahiro Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 23 days.

(21) Appl. No.: 09/635,143

(22) Filed: Aug. 9, 2000

(30) Foreign Application Priority Data

Apr. 18, 2000 (JP) ................................................ 12-116587

(51) Int. Cl.[7] ...................................................... B60Q 1/48

(52) U.S. Cl. ......................... 340/933; 340/928; 340/942; 455/99; 701/32; 701/117; 705/13

(58) Field of Search .................................... 340/933, 905, 340/928, 937, 942, 941, 943, 917, 932.2; 701/117, 32, 37; 705/13; 235/384, 375; 455/99

(56) References Cited

U.S. PATENT DOCUMENTS 5,705,996 * 1/1998 Eguchi et al. ....................... 340/928
5,839,085 * 11/1998 Yoshikawa et al. ................. 701/117
5,872,525 * 2/1999 Fukasawa et al. ................... 340/928
5,933,096 * 8/1999 Tsuda .................................. 340/928
5,952,940 * 9/1999 Matsumoto .......................... 340/905

* cited by examiner

*Primary Examiner*—Jeffery Hofsass
*Assistant Examiner*—Davetta W. Goins

(57) ABSTRACT

A vehicle-onboard DSRC (dedicated short-range communication) apparatus (10A) which can ensure suppression of communication error due to difference in type of motor vehicles. The apparatus includes an antenna (11) and a control unit (20) for receiving/transmitting information from/to an on-road transport managing equipment serving as an electronic toll collection system and installed in association with a road on which motor vehicles are to run, and a receiving sensitivity setting means (14A, 21 to 23, 30) for setting receiving sensitivity of the DSRC apparatus in an area for communication with the on-road transport managing equipment in dependence on vehicle type information indicative of type of the motor vehicle, wherein the receiving sensitivity setting means is so designed as to compensate for difference of electric field intensity of received radio signals due to different types of the motor vehicles with the receiving sensitivity.

15 Claims, 6 Drawing Sheets

FIG. 2

UNIT (dBm)

| H (cm) \ L (cm) | 0~50 | 50~100 | 100~150 | 150~200 |
|---|---|---|---|---|
| 0~50 | −60.5 | −63.0 | −66.0 | −68.0 |
| 50~100 | −61.0 | −64.0 | −67.0 | −68.5 |
| 100~150 | −62.0 | −65.0 | −68.0 | −69.0 |
| 150~200 | −63.0 | −66.0 | −69.0 | −69.5 |
| 200~250 | −64.0 | −67.0 | −69.5 | −70.0 |
| 250~300 | −65.0 | −68.0 | −70.0 | −70.5 |

VEHICLE-ONBOARD DSRC APPARATUS

BACKGROUND OF THE INVENTION

1. Field of the Invention

The present invention relates generally to an electronic toll collection system (hereinafter referred to as the ETC system in short) for an intelligent transport system (hereinafter also referred to as the ITS in short). More particularly, the present invention is concerned with a dedicated short-range communication apparatus (hereinafter also referred to as the DSRC apparatus) which is mounted on an automobile, a motor vehicle, a car or the like and which is designed to serve for disposing of payment of fee or charge or toll through cooperation with the ETC system. Hereinafter, the dedicated short-range communication apparatus will also be referred to as the DSRC apparatus or vehicle-onboard DSRC apparatus. Thus, in more concrete, the present invention concerns an improvement of the vehicle-onboard DSRC apparatus such that the receiving sensitivity thereof can be variably or adjustably set in dependence on the type or specie of the motor vehicle on which the DSRC apparatus is mounted for the purpose of suppressing or preventing error(s) which may otherwise occur in the radio communication with on-road transport managing equipment such as exemplified by the ETC system mentioned above which is installed stationarily on the ground in association with a road such as a toll road and which is usually incorporated in the intelligent transport system.

2. Description of Related Art

Heretofore, the vehicle-onboard DSRC apparatus is well known in the art which is designed to perform communication wirelessly with the on-road transport managing equipment such as the ETC system equipment installed in association with a road such as a toll road for the motor vehicles for exchanging or transferring various information with the on-road transport managing equipment or ETC system.

In general, the receiving sensitivity of the vehicle-onboard DSRC apparatus is set lower than −60.5 dBm inclusive in conformance with the stipulations of the Standards prescribed for such vehicle-onboard DSRC apparatus. Further, the non-response level is required to be lower than −70.5 dBm inclusive.

Under the circumstances, the sensitivity of the vehicle-onboard DSRC apparatus is so adjusted as to lie within a range of −60.5 dBm to −70.5 dBm in the manufacturing factory, i.e., before shipping of the vehicle-onboard DSRC apparatus. In this conjunction, it is however noted that in the stage of manufacturing of the DSRC apparatus, it is not yet known on what type or species of the motor vehicle the DSRC apparatus is destined to be mounted. For this reason, the sensitivity of the DSRC apparatus is ordinarily and generally set at an average value on the order of −65 dBm.

For better understanding of the concept underlying the present invention, description will first be made in some detail of the conventional vehicle-onboard DSRC apparatus known heretofore. FIG. 4 of the accompanying drawings is a block diagram showing schematically and generally a structure of a conventional vehicle-onboard DSRC (Dedicated Short-Range Communication) apparatus which constitutes a part of an ETC (Electronic Toll Collection) system and which is comprised of a transmitting/receiving unit for performing communication with the ETC system (typical one of the on-road transport managing equipment) via a vehicle-onboard antenna and an overhead antenna unit of the ETC system (described hereinafter) and a control unit (not shown).

Referring to FIG. 4, the vehicle-onboard DSRC apparatus 10 includes a receiver section which is composed of a vehicle-mounted antenna 11 (i.e., antenna mounted on the vehicle) for receiving a radio signal sent from the on-road transport managing equipment such as the ETC system, a low-noise amplifier 12 for amplifying the received signal, a mixer circuit 13 for converting the frequency of the received signal into a low frequency by making use of a frequency of a local oscillator (not shown), a semi-fixed variable gain amplifier 14 for amplifying the signal outputted from the mixer circuit 13, a detector circuit 15 for restoring received data from the received signal through demodulation or decoding, and a received data processing unit 16 for processing the received data.

FIG. 5 is a schematic side elevational diagram for illustrating in an outer appearance a general arrangement or configuration of a conventional ETC (electronic toll collection) system, a typical one of the on-road transport managing equipment. As can be seen in FIG. 5, automobiles or motor vehicles running on a road includes various species or types of motor vehicles such as, for example, a passenger car C1, a motor truck C2, a van and others.

In this conjunction, it is noted that the position at which the vehicle-onboard DSRC apparatus is installed differs from one to another type of the motor vehicle. By way of example, in the passenger cars C1 and motor truck C2 shown in FIG. 5, the positions at which the respective vehicle-onboard DSRC apparatuses 101 and 102 are installed differ from each other. More specifically, the height of the vehicle driving position (and hence the position of the vehicle-onboard DSRC apparatus) as measured from the ground level or road surface differs from one to another type or species of the motor vehicle, as indicated in FIG. 5 by H1 and H2 for the passenger car C1 and the motor truck C2, respectively. In addition, distances between the front tip or end of the motor vehicle and the location at which the vehicle-onboard DSRC apparatus is mounted differs in dependence on the vehicle types, as indicated by L1 and L2 for the motor vehicles C1 and C2, respectively, in FIG. 5.

In more concrete, in the case of the passenger car C1, the position at which the vehicle-onboard DSRC apparatus 101 is mounted is low because the position of the driver's seat is low. Consequently, in the passenger car C1, the height H1 of the position at which the vehicle-onboard DSRC apparatus 101 is mounted lower than the height H2 of the position at which the vehicle-onboard DSRC apparatus 102 of the motor truck C2 is mounted.

Moreover, it is noted that in the passenger car C1, the distance between the driver's seat and the front end of the car C1 (referred to as the nose distance) is long. In other words, in the passenger car C1, the distance L1 between the front end and the position at which the vehicle-onboard DSRC apparatus 102 is mounted is longer than the distance L2 between the front end of the motor truck C2 and the vehicle-onboard DSRC apparatus 102.

On the other hand, in a toll gate or the like system of a toll road, an overhead antenna unit ANT is installed as a part of the on-road transport managing equipment such as the ETC system, as can also be seen in FIG. 5. Additionally installed at a position in front of the overhead antenna unit ANT with a distance of several meters (e.g. 4 m) therefrom is a vehicle detector D for detecting the front end portion of the vehicle such as the passenger car C1, the motor truck C2 and the others. Needless to say, the vehicle detector D constitutes a part of the on-road transport managing equipment such as the ETC system.

The on-road transport managing equipment or the ETC system in this illustrative case is so designed as to perform communication with the vehicle-onboard DSRC apparatus such as 101; 102 via the vehicle-mounted antenna 11 and the overhead antenna unit ANT, starting from the time point at which the front end of the motor vehicle such as the passenger car C1, the motor truck C2 or the like has just traversed the vehicle detector D.

FIG. 6 is a characteristic diagram for illustrating profiles of the electric field intensities (received powers) of the radio signal emitted from the overhead antenna ANT and received by the vehicle-onboard DSRC apparatus as a function of the positions of the DSRC apparatus, wherein the position of the vehicle-onboard DSRC apparatus is taken along the abscissa with the electric field intensity being taken along the ordinate. At this juncture, it should be mentioned that although only the difference in the height H of the position of the vehicle-onboard DSRC apparatus is currently concerned, the characteristic of the electric field intensity differs in dependence on the difference in the distance L from the front end of the motor vehicle to the position of the vehicle-onboard DSRC apparatus.

Referring to FIG. 6, a single-dotted curve represents the characteristic curve in the case where the height H is 1 m (e.g. typified by the passenger car C1 or the like), while a solid-line curve represents the characteristic curve when the height H is 2 m (e.g. typified by the motor truck C2 or the like).

The electric field intensity of the radio signal (received signal power) radiated from the overhead antenna unit ANT exhibits such profile as illustrated in FIG. 6. More specifically, at the time point when the front end of the motor vehicle has reached the position at which the vehicle detector D of the on-road transport managing equipment or ETC system is installed, communication between the vehicle-onboard DSRC apparatus and the on-road transport managing equipment is started, as mentioned previously. In that case, the electric field intensity of the radio signal as received by the DSRC apparatus is at maximum at the time point immediately before the motor vehicle has reached the position at which the overhead antenna unit ANT is installed.

Further, as can be seen from the single-dotted curve and the solid-line curve shown in FIG. 6, the electric field intensity prevailing at the communication starting time point, i.e., at the time when the motor vehicle has passed by the position where the vehicle detector D is mounted differs in dependence on the height position H of the vehicle-onboard DSRC apparatus. For example, the electric field intensity becomes lower as the height H increases, the reason for which can be explained as follows.

Namely, the electromagnetic wave signal or radio signal is emitted from the overhead antenna unit of the on-road transport managing equipment from the position higher than the top of the motor vehicle and the area or range covered by the overhead antenna unit ANT, i.e., the coverage of the overhead antenna unit ANT, is restricted toward the road surface. Consequently, the radio wave radiated from the overhead antenna unit ANT becomes more difficult to be received as the height H increases particularly in the vicinity of the vehicle detector D.

More specifically, the position of the vehicle-onboard DSRC apparatus at the time point at which the front end or tip portion of the motor vehicle has transversed the vehicle detector D (i.e., at the time point when the communication between the on-road transport managing equipment or ETC system and the vehicle-onboard DSRC apparatus is started) differs in dependence on the nose length L (length of the bonnet) of the motor vehicle and the height H of the vehicle-onboard DSRC apparatus and hence in dependence on the vehicle types or species such as the passenger car C1, the motor truck C2, the van and others). Consequently, the electric field intensity of the radio signal received at the time point at which the communication is started becomes different in dependence on the height position H of the vehicle-onboard DSRC apparatus and the nose length L.

Under the circumstances, there may arise such situation that the receiving sensitivity of the vehicle-onboard DSRC apparatus becomes insufficient at the time point when the front end of the motor vehicle has just transversed the vehicle detector D, making it impossible to perform the communication, although it depends on the preset value of the receiving sensitivity of the vehicle-onboard DSRC apparatus.

By way of example, let's assume that the receiving sensitivity of the vehicle-onboard DSRC apparatus is set at −65 dBm. In that case, when the vehicle concerned is the passenger car C1, the radio signal of the electric field intensity higher than −65 dBm (e.g. on the order of −58 dBm) can be received by the DSRC apparatus mounted on the passenger car C1 at the time point when the front end of the motor vehicle has reached the vehicle detector D. By contrast, when the vehicle concerned is the motor truck C2, the electric field intensity of the radio signal received by the DSRC apparatus mounted on the motor truck C2 is lower than −65 dBm (e.g. on the order of −68 dBm), as a result of which the communication between the DSRC apparatus of the motor truck C2 and the on-road transport managing equipment (ETC system) is rendered impossible (see FIG. 6).

On the other hand, when the receiving sensitivity of the DSRC apparatus is set high (e.g. on the order of −70.5 dBm), communication with the overhead antenna unit ANT will be started already at a position which precedes to the vehicle detector D in case the motor vehicle concerned is the passenger car C1.

As is apparent from the above, when the receiving sensitivity of the vehicle-onboard DSRC apparatus is set at an unnecessarily high level, such unwanted situation may arise that erroneous communication is started between the DSRC apparatus and the on-road transport managing equipment (ETC system) before the motor vehicle equipped with the DSRC apparatus transverses the vehicle detector D when a motor vehicle running ahead which is not equipped with the DSRC apparatus transverses the vehicle detector D. In that case, communication with the on-road transport managing equipment will be started instantaneously when the motor vehicle running ahead and equipped no DSRC apparatus passes by the vehicle detector D before the motor vehicle which is equipped with the DSRC apparatus transverses the vehicle detector D, as a result of which the motor vehicle running ahead may erroneously be identified as the vehicle equipped with the DSRC apparatus, incurring erroneous communication between the motor vehicle running ahead and the on-road transport managing equipment or ETC system.

When the situation described above occurs really, the communication with the on-road transport managing equipment (ETC system) has already been completed at the time when the vehicle equipped with the DSRC apparatus actually transverses the vehicle detector D, incurring undesirably occurrence of the communication error.

As will now be appreciated, since the mounting position of the vehicle-onboard DSRC apparatus differs in dependence on the types or species of the motor vehicles, difference makes appearance in the electric field intensity of the radio signal received by the vehicle-onboard DSRC apparatus at the time point when the front end portion of the motor vehicle transverses the vehicle detector D, which may possibly incur the communication error.

In the present state of the art, the communication error mentioned above can ordinarily be suppressed by setting properly the directivity of the overhead antenna unit ANT, location/orientation thereof and the communication protocol as adopted. However,when the conditions for the radio signal change due to weather, traffic statuses in the vicinity of the toll gate and for other reasons, communication error may take place unwantedly, giving rise to a problem.

In this conjunction, it should also be added that when the communication error such as mentioned above occurs actually, the automatic toll keeper function will be invalidated, although such serious problem as erroneous payment or the like can be excluded owing to the recovery function of the communication protocol and the on-road transport managing equipment. In that case, however, the driver is forced to park once his or her car at the toll gate for paying the toll.

Furthermore, it should be mentioned that in the communication area, there exists a communication-invalidated area (area where the electric field intensity of the radio signal emitted from the overhead antenna unit is very low) due to the side robes of the output of the overhead antenna unit ANT in addition to the reception irregularities due to difference of the motor vehicle type. In such communication area, the reception characteristic itself does change, which causes the communication error to be more likely to occur.

As will now be understood from the foregoing, in the conventional DSRC apparatus, the receiving sensitivity thereof is set at a predetermined constant level uniformly among the motor vehicles regardless of difference in the type or species thereof. Consequently, when the receiving sensitivity of the vehicle-onboard DSRC apparatus is lower than a prescribed level, the radio signal radiated from the overhead antenna unit of the on-road transport managing equipment such as the ETC system can not be received by the vehicle-onboard DSRC apparatus, rendering the communication impossible, whereas when the receiving sensitivity is set higher than the prescribed level, erroneous communication may take place before the motor vehicle enters the communication area, giving rise to a problem that the function of the vehicle-onboard DSRC apparatus can not effectively be utilized, to a disadvantage.

SUMMARY OF THE INVENTION

In the light of the state of the art described above, it is an object of the present invention to solve the problems mentioned above by providing a vehicle-onboard DSRC (dedicated short-range communication) apparatus which is so designed as to prevent positively the communication error which may occur in the communication between the DSRC apparatus and the on-road transport managing equipment such as electronic toll control system due to differences in the type or species of the motor vehicles by setting variably or adjustably the receiving sensitivity for a radio signal in consideration of the difference in the type or species of the motor vehicles.

In view of the above and other objects which will become apparent as the description proceeds, there is provided according to a general aspect of the present invention a vehicle-onboard DSRC (dedicated short-range communication) apparatus which includes an antenna and a control unit for receiving/transmitting information from/to an on-road transport managing equipment such as electronic toll collection system installed in association with a road on which motor vehicles are to run, and a receiving sensitivity setting means for setting receiving sensitivity of the DSRC apparatus in an area for communication with the on-road transport managing equipment in dependence on vehicle type information indicative of type of the motor vehicle, wherein the receiving sensitivity setting means is designed to compensate for difference of electric field intensity of received radio signals due to different types of the motor vehicles with the receiving sensitivity.

By virtue of the arrangement of the vehicle-onboard DSRC apparatus described above, the problems of the conventional DSRC apparatus elucidated previously can satisfactorily be solved without incurring expensiveness.

In a preferred mode for carrying out the present invention, the vehicle type information mentioned above should preferably include information concerning at least one of a height of a position at which the DSRC apparatus is mounted on the motor vehicle and a distance between the above-mentioned position and a front end of the motor vehicle. In that case, the receiving sensitivity setting means should preferably be so designed as to set the receiving sensitivity in dependence on at least one of the height of the position at which the DSRC apparatus is mounted and the distance between the above-mentioned position and the front end of the motor vehicle.

With the arrangement described above, the problems which the conventional apparatuses have suffered can be successfully disposed of.

In another preferred mode for carrying out the present invention, the receiving sensitivity setting means of the vehicle-onboard DSRC apparatus may preferably be so designed as to set adjustably the receiving sensitivity by referencing map data prepared in advance on the basis of the vehicle type information.

With the arrangement described above, setting of the desired receiving sensitivity can be much facilitated.

In yet another preferred mode for carrying out the present invention, the receiving sensitivity setting means of the vehicle-onboard DSRC apparatus may be so designed as to set adjustably the receiving sensitivity by performing interpolation arithmetic for the map data.

With the arrangement described above, the optimal receiving sensitivity should be set with high definition.

In a still another preferred mode for carrying out the present invention, the receiving sensitivity setting means of the vehicle-onboard DSRC apparatus may preferably be so designed as to set adjustably the receiving sensitivity on the basis of an arithmetic formula in accordance with the vehicle type information.

With the arrangement described above, setting of the desired receiving sensitivity can be much facilitated while ensuring high reliability.

In a further preferred mode for carrying out the present invention, the receiving sensitivity setting means of the vehicle-onboard DSRC apparatus may be so designed as to set limit values of the receiving sensitivity.

Owing to the arrangement describe above, erroneous setting of abnormal values of the receiving sensitivity can be excluded positively.

In a yet further preferred mode for carrying out the present invention, the vehicle-onboard DSRC apparatus may include an amplifier for amplifying a received signal supplied from the antenna, wherein the receiving sensitivity setting means is so designed as to set variably an amplification factor of the amplifier in accordance with the vehicle type information.

With the arrangement describe above, setting of the receiving sensitivity can be much simplified and facilitated.

In a still further preferred mode for carrying out the present invention, the vehicle-onboard DSRC apparatus may further include a sensitivity adjusting unit for adjusting the receiving sensitivity on the basis of electric field intensity of a received signal received from the on-road transport managing equipment such as electronic toll collection system, and a received signal processing unit for processing the received signal in response to an output signal of the sensitivity adjusting unit, wherein the sensitivity adjusting unit includes an electric field intensity discriminating means for comparing the electric field intensity of the received signal with a reference value, the receiving sensitivity setting means being designed to set adjustably the reference value in accordance with the vehicle type information, and wherein the received signal processing unit is so designed as to process the received signal when the electric field intensity of the received signal is equal to or exceeds the reference value.

With the arrangement described above, high reliability can be ensured for the signal processing operation.

In a preferred mode for carrying out the present invention, the receiving sensitivity setting means of the vehicle-onboard DSRC apparatus may include a mounted position input means for inputting information concerning a mounted position at which the DSRC apparatus is mounted on the motor vehicle, a DSRC apparatus position storing unit for storing the mounted position of the DSRC apparatus, and a receiving sensitivity setting unit for setting the receiving sensitivity in dependence on the mounted position of the DSRC apparatus.

With the arrangement described above, setting of the receiving sensitivity can be much facilitated by using the IC card or the like.

In another preferred mode for carrying out the present invention, the mounted position input means of the vehicle-onboard DSRC apparatus may be comprised of a display device and a ten key array provided in the control unit.

In yet another preferred mode for carrying out the present invention, the mounted position input means of the vehicle-onboard DSRC apparatus may be comprised of a display device and an increment key or alternatively a decrement key provided in the control unit.

In still another preferred mode for carrying out the present invention, the mounted position input means of the vehicle-onboard DSRC apparatus may be comprised of a voice input means.

In a further preferred mode for carrying out the present invention, the mounted position input means of the vehicle-onboard DSRC apparatus may be constituted by an IC card dedicated for setting up the DSRC apparatus.

By virtue of the arrangement described above, there can be obtained the advantageous effect that error involved in the communication between the DSRC apparatus and the on-road transport managing equipment such as the electronic toll collection system due to differences in the type or species of the motor vehicles can be suppressed with high reliability, to another great advantage.

In a yet further preferred mode for carrying out the present invention, the receiving sensitivity setting means of the vehicle-onboard DSRC apparatus may include a vehicle information storing unit for storing vehicle information, a vehicle type information discriminating unit for discriminatively deciding the vehicle type information on the basis of the vehicle information, and a receiving sensitivity setting unit for setting the receiving sensitivity in accordance with the vehicle type information decided discriminatively by the vehicle type information discriminating unit.

Owing to the arrangements described above, there can be obtained the advantageous effect that the communication error due to differences in the type of the motor vehicles is positively prevented without resorting to manipulation of the mounted position input means.

In a still further preferred mode for carrying out the present invention, the control unit of the vehicle-onboard DSRC apparatus may be so designed as to transfer information concerning toll collection with on-road transport managing equipment installed in association with a toll road and serving as an electronic toll collection system, whereby toll collection is performed automatically on the basis of the information concerning the toll collection.

Owing to the arrangements of the vehicle-onboard DSRC apparatus described in the foregoing, the DSRC apparatus employed in combination with the ETC (electronic toll collection) system is very effective for preventing traffic jam at the toll gate to a great advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a view for illustrating map data of receiving sensitivities set for the vehicle-onboard DSRC apparatus according to the first embodiment of the invention;

DESCRIPTION OF THE PREFERRED EMBODIMENTS

Figure 1:
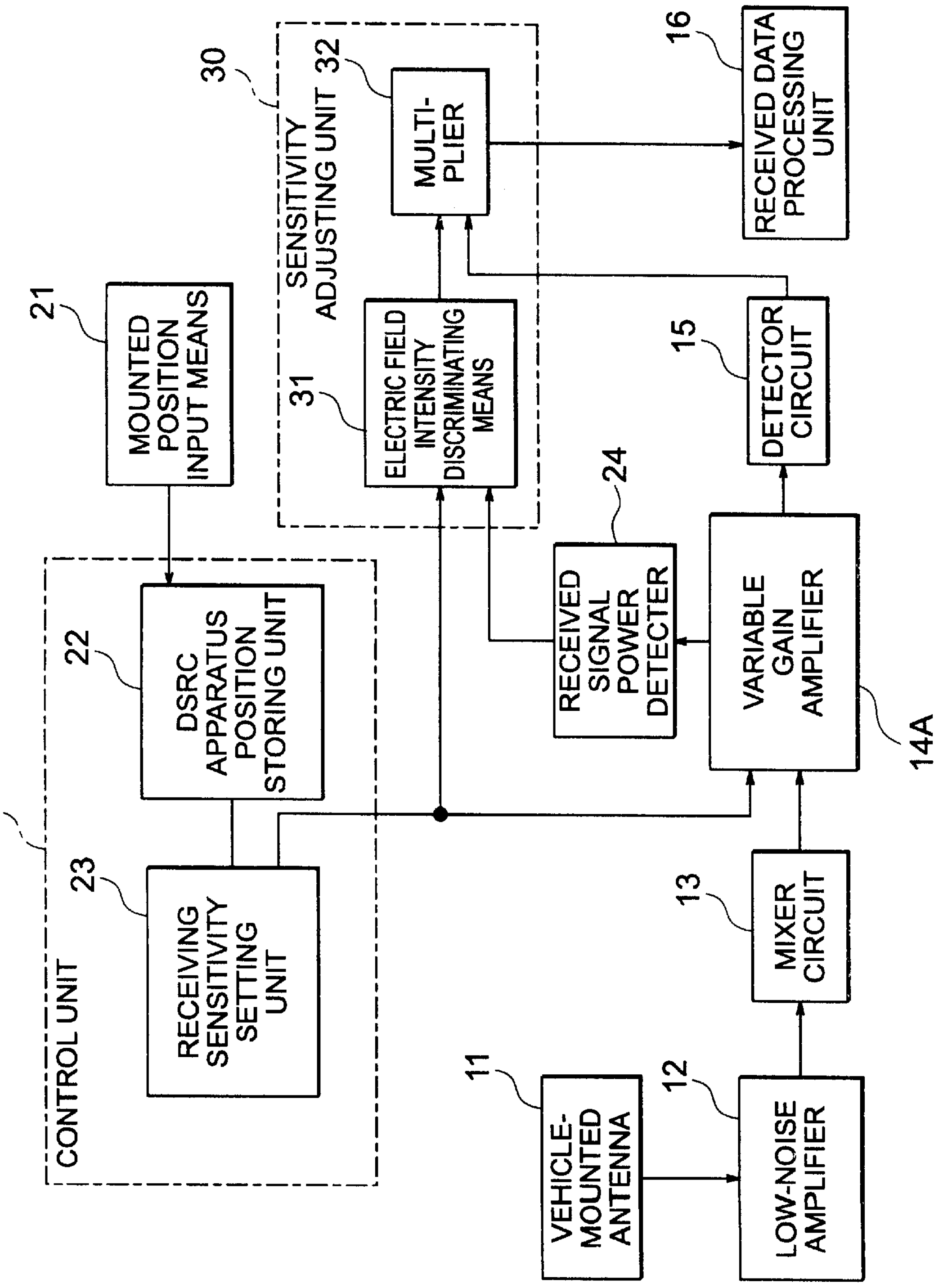
FIG. 1 is a block diagram showing a general arrangement of a vehicle-onboard DSRC apparatus according to a first embodiment of the invention.

The present invention will be described in detail in conjunction with what is presently considered as preferred or typical embodiments thereof by reference to the drawings. In the following description, like reference characters designate like or corresponding parts throughout the several views. Further, in the following, the present invention will be described in conjunction with the on-road transport managing equipment desired to serve as the electronic toll collection system, being however understood that the DSRC apparatus according to the invention can find other applications as well.

Embodiment 1

Figure 4:
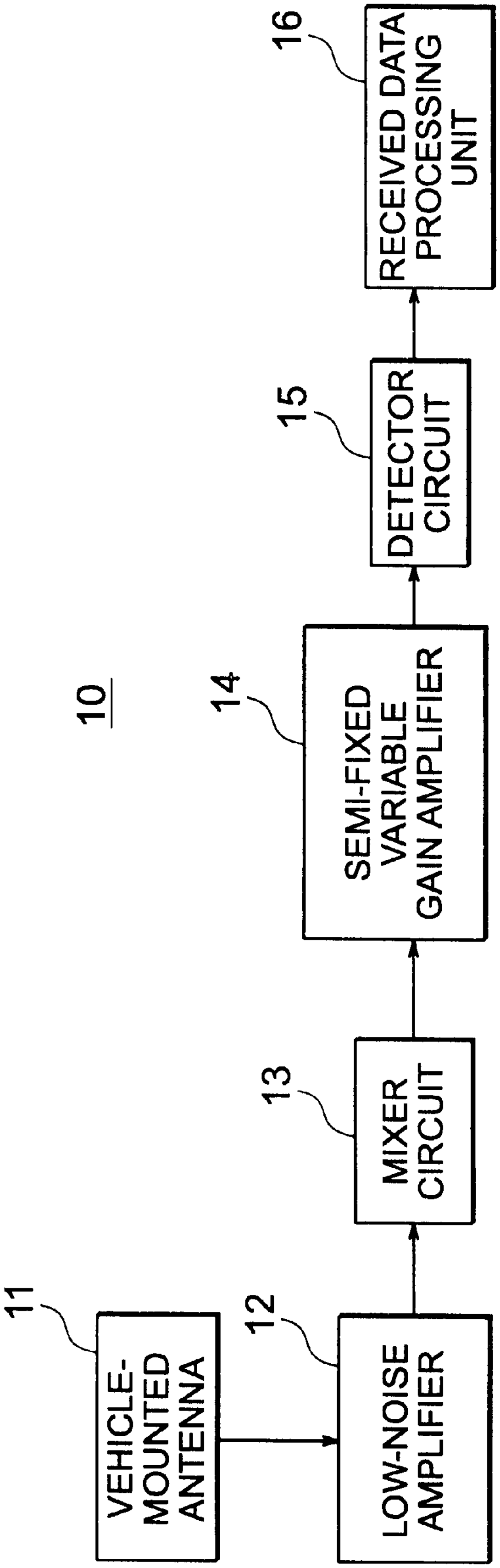
FIG. 4 is a block diagram showing schematically a general arrangement of a conventional vehicle-onboard DSRC apparatus.

Now, description will be directed to the vehicle-onboard DSRC apparatus according to a first embodiment of the present invention. FIG. 1 is a block diagram showing a general arrangement of a vehicle-onboard DSRC apparatus according to the first embodiment of the invention. In this figure, components same as or similar to those described hereinbefore by reference to FIG. 4 are denoted by same reference numerals while components functionally equivalent or corresponding to those shown in FIG. 4 are denoted by like reference numerals each affixed with "A", and repeated description of these components will be omitted.

Figure 5:
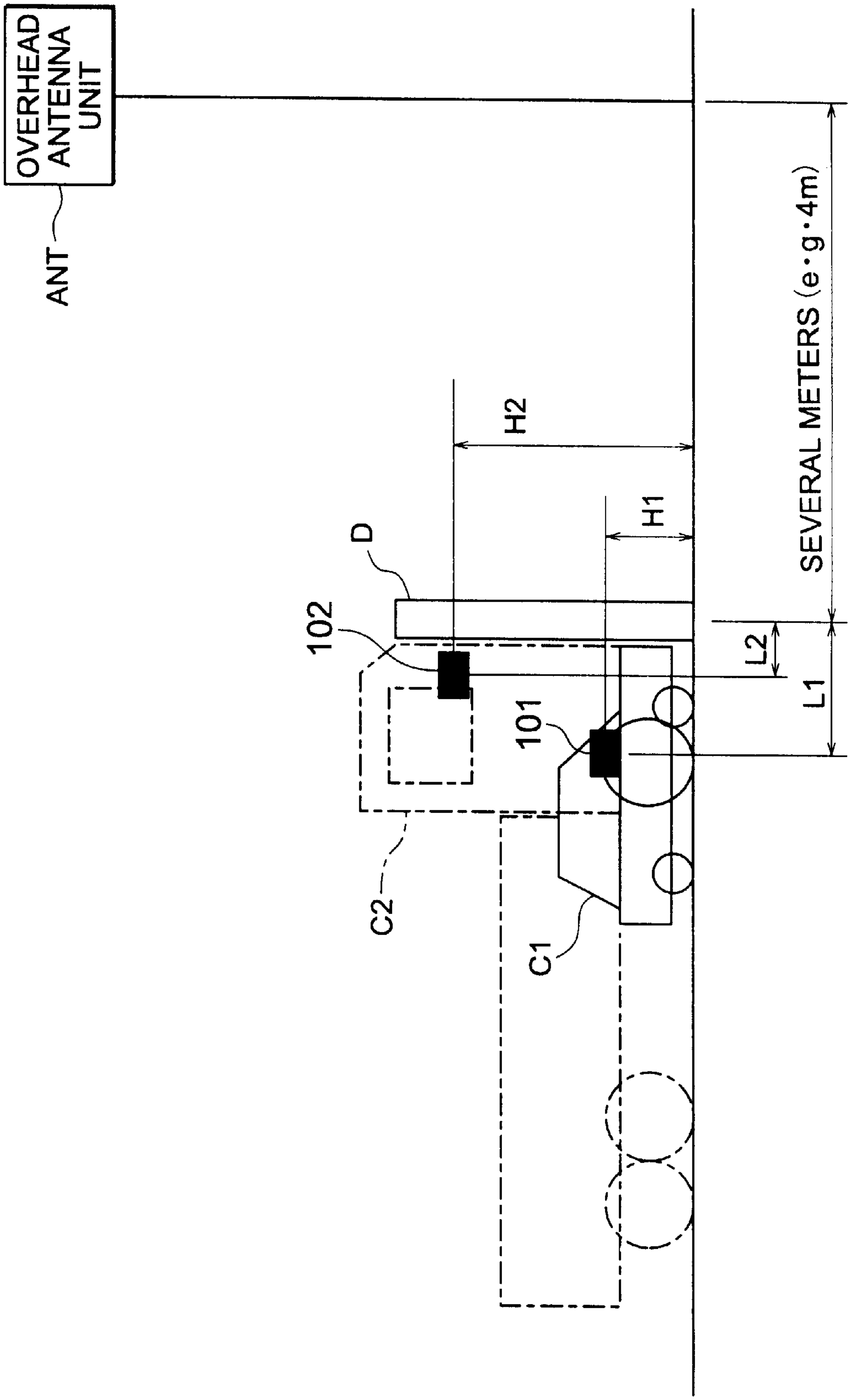
FIG. 5 is a schematic side elevational view showing in an outer appearance positional relations between motor vehicles having conventional DSRC apparatuses mounted thereon and an overhead antenna unit and a motor vehicle detector of an on-road transport managing equipment such as an ETC system.
Figure 6:
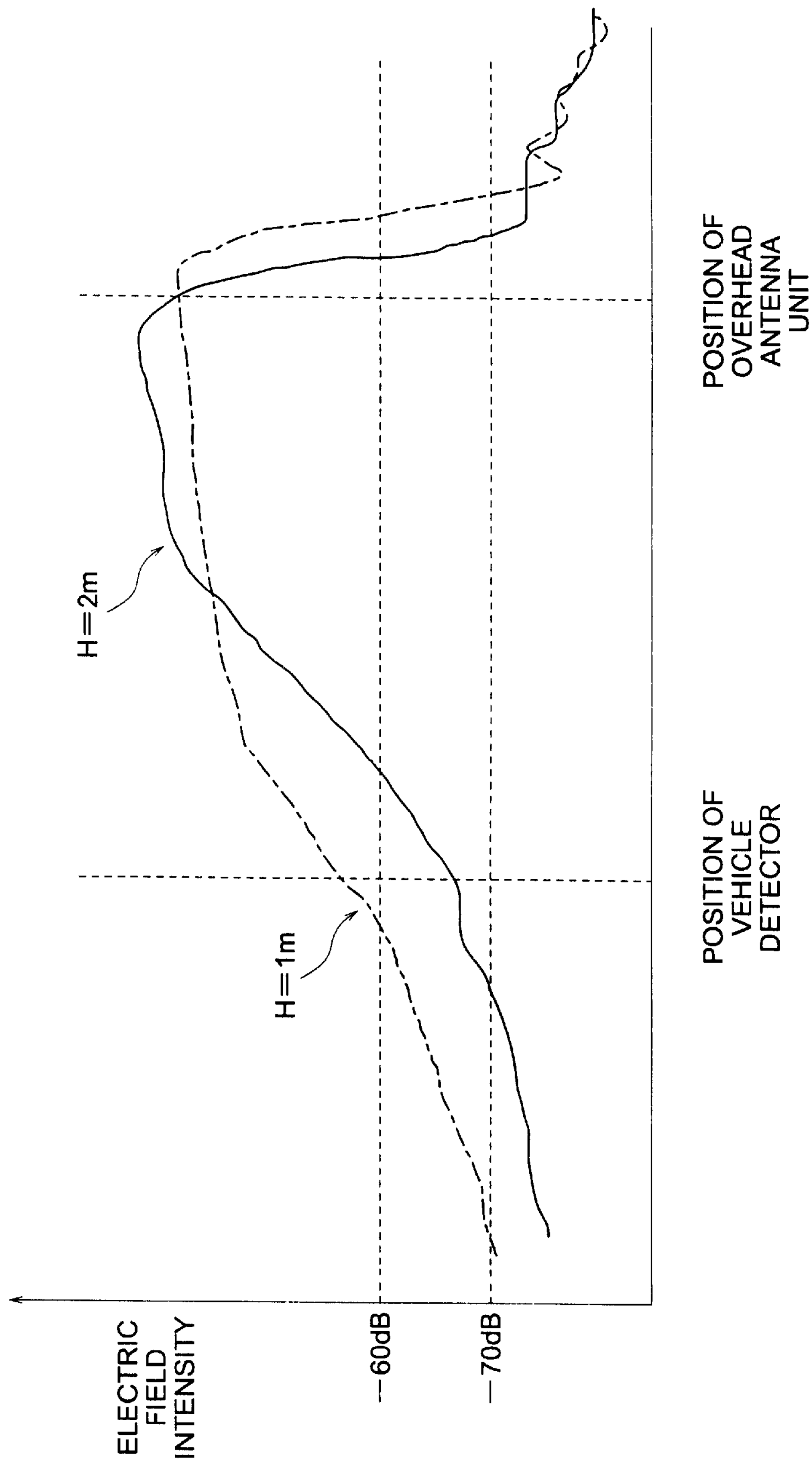
FIG. 6 is a characteristic diagram for illustrating profiles of electric field intensities of a radio signal emitted by the overhead antenna unit as a function of positions of the vehicle-onboard DSRC apparatuses.

Further, positional relations between the motor vehicles carrying the respective DSRC apparatuses and the overhead antenna unit and the vehicle detector of the on-road transport managing equipment implemented as the ETC system as well as the characteristics of the electric field intensity of radio signal received by the vehicle-onboard DSRC apparatuses are essentially similar to those described hereinbefore by reference to FIGS. 5 and 6.

In the following description, it is assumed, only by way of example, that the on-road transport managing equipment is that for the ETC (Electronic Toll Collection) system and that transactional communication for the toll settlement is performed between the vehicle-onboard DSRC (Dedicated Short-Range Communication) apparatus and the on-road transport managing equipment or ETC system.

Now, referring to FIG. 1, the vehicle-onboard DSRC apparatus 10A according to the instant embodiment of the invention is comprised of a vehicle-mounted antenna 11, a low-noise amplifier 12, a mixer circuit 13, a variable gain amplifier 14A, a detector circuit 15 and a received data processing unit 16. These components and arrangement thereof are same as those of the conventional vehicle-onboard DSRC apparatus 10 described hereinbefore by reference to FIG. 4. In addition to these components, the vehicle-onboard DSRC apparatus 10A includes a control unit 20 for setting variably or adjustably the receiving sensitivity for the radio signal emitted from the overhead antenna unit ANT of the on-road transport managing equipment serving as the ETC system, a mounted position input means 21 for inputting information indicative of the mounted position of the vehicle-onboard DSRC apparatus to the control unit 20, a received signal power detector 24 for detecting the received power (electric field intensity of the received radio signal) from the output signal of the variable gain amplifier 14A and a sensitivity adjusting unit 30 provided in association with the receiver section and the control unit 20.

The variable gain amplifier 14A constituting a part of the receiver section serves as the receiving sensitivity setting means which is controlled by the control unit 20 similarly to the sensitivity adjusting unit 30 so that the amplification factor of the variable gain amplifier 14A can variably be set to a desired value.

More specifically, the receiving sensitivity setting means is so designed as to set the receiving sensitivity of the vehicle-onboard DSRC apparatus within the area for communication with the on-road transport managing equipment such as the electronic toll collection system in accordance with the mounted position of the DSRC apparatus (or information concerning the type or species of the vehicle) to thereby compensate for difference in the electric field intensity of the received radio signal by taking into account the type or species of the motor vehicle by adjusting correspondingly the receiving sensitivity of the DSRC apparatus.

To this end, the control unit 20 includes a DSRC apparatus position storing unit 22 for storing the information of the position at which the DSRC apparatus is mounted on the motor vehicle and a receiving sensitivity setting unit 23. On the other hand, the sensitivity adjusting unit 30 is comprised of an electric field intensity discriminating means 31 (comparator) f or determining discriminatively the electric field intensity of the received radio signal and a multiplier 32 (AND circuit).

The DSRC apparatus position storing unit 22 incorporated in the control unit 20 is adapted for storing therein the information concerning the positions (e.g. height H, distance L and the like) at which the DSRC apparatus is mounted, which information is inputted from the mounted position input means 21.

On the other hand, the receiving sensitivity setting unit 23 of the control unit 20 is designed to set adjustably the amplification factor of the variable gain amplifier 14A and a reference value for the electric field intensity discriminating means 31 on the basis of the mounted position information of the vehicle-onboard DSRC apparatus, which information is stored in the DSRC apparatus position storing unit 22 as described above.

The electric field intensity discriminating means 31 incorporated in the sensitivity adjusting unit 30 is designed to compare the electric field intensity detected by the received signal power detector 24 with the reference value set by the receiving sensitivity setting unit 23 for thereby outputting an electric field intensity decision signal.

The multiplier 32 is designed for logically ANDing the electric field intensity decision signal and received data outputted from the detector circuit 15, wherein the logical product signal outputted from the multiplier 32 is supplied to the received data processing unit 16.

The received data processing unit 16 is designed to respond to the output signal of the multiplier 32 incorporated in the sensitivity adjusting unit 30 for thereby processing the received signal when the electric field intensity of the received radio signal is greater than a reference value inclusive.

Parenthetically, the vehicle-onboard DSRC apparatus 10A includes a transmitter and a local oscillator for the mixer circuit 13 and a transmission modulator and others, although illustration thereof is omitted in FIG. 1.

Further, the control unit 20 includes a transmission control facility in association with the received data processing unit 16, a variety of manipulation switches, a display device for displaying ETC information for the toll transaction and other, and a removable storage medium such as an IC card, etc.

With the arrangements described above, the vehicle-onboard DSRC apparatus 10A is adapted to fetch the data received from the on-road transport managing equipment serving as the ETC system while outputting data to be sent to the on-road transport managing equipment through the transmitter.

The mounted position input means 21 may be constituted by an array of manipulation switches (ten keys or the like) provided on the control unit 20.

Next, operation of the vehicle-onboard DSRC apparatus according to the first embodiment of the invention (see FIG. 1) will be described by reference to FIGS. 5 and 6 together with FIG. 2, wherein FIG. 2 is a view for illustrating desired or target receiving sensitivities at the time point where the communication is started (i.e., at the time point at which the front end portion of a motor vehicle has reached the vehicle detector D).

Referring to FIG. 2, the desired receiving sensitivities (dBm) are illustrated in the form of map data by taking as parameters the height H of the vehicle-onboard DSRC apparatus and the distance L between the front end of the motor vehicle and the position of the vehicle-onboard DSRC apparatus on the presumption that the minimum sensitivity value is set to be −60.5 (dBm) for the minimum height H and the minimum distance L while for the maximum height H and the maximum distance L the maximum sensitivity value is set to be −70.5 (dBm).

Initially, upon mounting the DSRC apparatus on the motor vehicle, the information concerning the position (i.e., the height H and the distance L) at which the DSRC apparatus is to be mounted is acquired by measurement, whereon the acquired information is inputted into the DSRC apparatus position storing unit 22 incorporated in the control unit 20 with the aid of the mounted position input means 21.

In other words, a worker engaged in mounting the DSRC apparatus measures the height H from the ground surface to the mounted position of the DSRC apparatus and the distance L between the front end (nose) of the motor vehicle and the mounted position of the DSRC apparatus and inputs the measured values of the height H and the distance L through the medium of the mounted position input means 21 which may be constituted by the ten key.

In that case, when the input information is only of the distance L, the height H may be set zero or alternatively set fixedly to a value "100 or so" which corresponds to the height in an ordinary motor vehicle. Similarly, when the input information is only of the height H, the distance L may be set zero or alternatively set fixedly to a value corresponding to the distance in the ordinary motor vehicle.

The receiving sensitivity setting unit 23 incorporated in the control unit 20 makes reference to the map data shown in FIG. 2 on the basis of the parameter information concerning the mounted position of the DSRC apparatus to thereby set the optimal desired reception sensitivity for each of the mounted positions of the DSRC apparatuses.

The map data shown in FIG. 2 are so determined on the basis of the characteristic curve illustrated in FIG. 6 that the desired receiving sensitivities can be realized.

In succession, the control unit 20 drives the variable gain amplifier 14A and the sensitivity adjusting unit 30 so that the desired reception sensitivity determined by the receiving sensitivity setting unit 23 can be validated.

In the case where the amplification factor (gain) of the variable gain amplifier 14A is set variable in the required level, the desired receiving sensitivity can be realized by adjusting the S/N ratio of the receiving loop.

In more concrete, since the amplification factor of the variable gain amplifier 14A is adjusted in relation to e.g. the input voltage from the control unit 20, the desired or target receiving sensitivity can be realized by controlling a digital-to-analogue (D/A) converter (not shown) which is incorporated in the control unit 20.

Further, in case the receiving sensitivity is set variable with the sensitivity adjusting unit 30, the receiving gain of the variable gain amplifier 14A is set to a predetermined S/N ratio (the value which can ensure sufficient receiving sensitivity) so that the output of the sensitivity adjusting unit 30 becomes active (or assumes "H" level) when the electric field intensity discrimination signal outputted from the electric field intensity discriminating means 31 reaches or exceeds a predetermined received power.

The electric field intensity discriminating means 31 which may be implemented in the form of a comparator receives as inputs thereto the detected value of the received electric field intensity (analogue voltage proportional to the received power) from the received signal power detector 24 and the reference value (variable signal outputted from a D/A converter or the like) outputted from the control unit 20, to thereby decide the desired receiving sensitivity in conformance with the reference value.

Thus, the multiplier 32 which is designed to logically ORing the electric field intensity discrimination signal and the output signal of the detector circuit 15 prevents the waveform of the received radio signal from being outputted to the received data processing unit 16. In this manner, the desired receiving sensitivity adjusting function can be realized.

By way of example, in the case of the passenger car C1 of a relatively low overall height (refer to FIG. 5), the receiving sensitivity approximating the minimum value (−60.5 dBm) is set to thereby prevent the vehicle-onboard DSRC apparatus of the passenger car C1 from assuming the state capable of performing communication with the on-road transport managing equipment (ETC system) before the car C1 has reached the position of the vehicle detector D.

By contrast, for the motor truck C2 having a relatively large height, the receiving sensitivity is set to a value approximating the maximum value (−70.5 dBm) so that the DSRC apparatus mounted on the motor truck C2 can assume the state capable of conducting communication with the on-road transport managing equipment (ETC system) without fail upon reaching the position of the vehicle detector D.

In this manner, the receiving sensitivity setting unit 23 incorporated in the control unit 20 is designed to set adjustably the desired reception sensitivity on the basis of the information concerning the mounted position of the DSRC apparatus, whereby difference or dispersion of the electric field intensity of the received radio signal due to the vehicle types or species can be compensated for, which is effective for suppressing occurrence of the communication error with high reliability.

At this juncture, it should be noted that the receiving sensitivity setting unit 23 may preferably be so designed as to interpolate the map data with a view to further enhancing the definition of the desired reception sensitivity.

Furthermore, the receiving sensitivity setting unit 23 may also be so designed to set the target or desired receiving sensitivity Ko in accordance with the undermentioned expression (1) without resorting to the map data shown in FIG. 2.

$$Ko=(-60.5)-a\ L-b\ H \tag{1}$$

In the above expression (1), H represents the height (cm) of the position at which the DSRC apparatus is mounted, as measured from the ground surface, L represents the distance (cm) between the front end of the motor vehicle and the mounted position of the DSRC apparatus, and a and b represent predetermined coefficients which may be set e.g. 0.04 and 0.015, respectively.

The receiving sensitivity setting unit 23 may further be so designed as to set limit values (upper limit value and lower limit value) to be imposed on the range of the values of the receiving sensitivity Ko determined arithmetically in accordance with the above-mentioned expression (1) in order to prevent erroneous setting of abnormal values.

As will now be appreciated from the foregoing, by providing the variable gain amplifier 14A and the sensitivity adjusting unit 30 controlled adjustably by the receiving sensitivity setting unit 23 of the control unit 20 which serves a s the receiving sensitivity setting means to thereby set adjustably the receiving sensitivity in dependence on the vehicle type or species information within the communication area for communication with the on-road transport managing equipment (ETC system), difference or dispersion of the electric field intensity of the radio signal due to difference of the vehicle type can be compensated for to thereby allow the sensitivity of the receiving loop to be set at the desired receiving sensitivity. Thus, the communication error can be prevented or suppressed with enhanced reliability.

Further, owing to such arrangement that the amplification factor of the variable gain amplifier 14A can adjustably be set by means of the receiving sensitivity setting unit 23 and that the reference value for the electric field intensity discriminating means 31 can also be set variable or adjustable, the dynamic range of the receiving sensitivity can be ensured after having adjusted the S/N ratio of the received signal in the variable gain amplifier 14A.

In addition, by setting the limit values for the range of the desired receiving sensitivity, the receiving gain can properly be adjusted to an optimal value. Thus, even when the received signal of high field intensity (high power level) is inputted, the variable gain amplifier 14A is protected against saturation. Thus, a large dynamic range can be assured for the receiving sensitivity.

Furthermore, because the receiving gain can be set sufficiently large to allow the receiving sensitivity to be set for the radio signal of high intensity level, the S/N ratio of the receiving loop can be increased, which in turn is effective for setting the tolerance of the receiving sensitivity with high accuracy.

Additionally, because the existing ten key which is ordinarily provided in the conventional vehicle-onboard DSRC apparatus is used as the input means 21 for inputting the information concerning the mounted position of the vehicle-onboard DSRC apparatus, cost involved for implementing the input means can be spared. Besides, by employing the ten keys, numerical values can be inputted directly and speedily with high accuracy.

Moreover, by referencing the map data (shown in FIG. 2) on the basis of the information concerning the mounted position of the DSRC apparatus (i.e., information of the height H and the distance L), the target receiving sensitivity can be set speedily and easily.

Furthermore, by interpolating arithmetically the map data values, the desired receiving sensitivity can be set with high definition.

Besides, by resorting to the arithmetic expression (1) based on the mounted position of the DSRC apparatus, the limit values can be set as mentioned previously, whereby erroneous setting of abnormal values can be prevented.

Thus, with the vehicle-onboard DSRC apparatus, the information concerning toll collection (toll payment and reception) can be processed through radio communication at the toll collection gate between the ETC system which is provided with toll collection (toll payment and reception) facilities and an external storage medium, whereby toll transaction processing can be carried out without fail.

In this conjunction, it goes without saying that the range in which the receiving sensitivity is variably set must conform to the relevant stipulations of the DSRC Standard.

The foregoing description of the first embodiment of the present invention has been made on the presumption that the vehicle-onboard DSRC apparatus for the ETC system is mounted on the motor vehicle running on a toll road together with the antenna 1 for performing information exchange with the on-road transport managing equipment of the ETC system through wireless or radio communication to thereby realize automatically the toll collection (toll payment and reception) job. It should however be understood that the DSRC apparatus according to the present invention can find other applications than the ETC system substantially to the same or equivalent advantageous effects.

In the foregoing description, it has been presumed that the height H at which the vehicle-onboard DSRC apparatus is mounted and the distance L between the DSRC apparatus and the front end of the vehicle are employed as the vehicle type information. It should however be appreciated that only one of the height H and the distance may be employed as the vehicle type information. In that case, the other information will be fixed to a constant value.

Further, it has been described that the variable gain amplifier 14A succeeding to the mixer circuit 13 is used as the means for variably setting the amplification factor of the received signal in dependence on the vehicle type information. It should however be appreciated that the low-noise amplifier 12 provided in the stage preceding to the mixer circuit 13 may be employed for variably setting the amplification factor.

Furthermore, it has also been described that the receiving sensitivity setting unit 23 is designed to set variably or adjustably both the amplification factor of the variable gain amplifier 14A and the reference value for the electric field intensity discriminating means 31 incorporated in the sensitivity adjusting unit 30. However, the receiving sensitivity setting unit 23 may be so designed as to set variably only one of the amplification factor and the reference value.

Furthermore, although it has been described that the ten keys are used as the mounted position input means 21, it is equally possible to make use of a manipulation switch or switches which the DSRC apparatus is equipped with (e.g. increment key or decrement key) for incrementing or decrementing one-by-one a numeral displayed on the display device of the vehicle-onboard DSRC apparatus to thereby determine the numerical value to be inputted.

In that case, the number of the manipulation switch keys can be reduced, which is advantageous from the standpoint of implementation of the DSRC apparatus in a small-size structure.

Additionally, a voice input means (voice recognition function) provided for the vehicle-onboard DSRC apparatus may be used as the mounted position input means 21.

In that case, the mounted position of the DSRC apparatus can easily be inputted by voice.

Furthermore, as the mounted position input means 21, there may be employed an IC for setting up the DSRC apparatus.

In that case, the mounted position of the DSRC apparatus may be stored in the IC in advance, for allowing the information concerning the mounted position of the DSRC apparatus to be inputted from the IC upon setting-up of the vehicle-onboard DSRC apparatus.

Ordinarily, when the DSRC apparatus is purchased, the maker or trader bears the burden for mounting the DSRC apparatus. Further, he or she will have to load the vehicle information (vehicle type information and the like) in a security IC card incorporated in the DSRC apparatus with the aid of an IC card destined for setting-up. In that case, in the IC card, there is stored the inherent vehicle information previously by the organization which issued the IC card.

Accordingly, by storing in advance the information concerning the position at which the DSRC apparatus is to be mounted in the IC card as one of the vehicle information, the mounted position of the DSRC apparatus can be inputted to the DSRC apparatus position storing unit 22 incorporated in the control unit 20 when the DSRC apparatus is set up.

Embodiment 2

In the case of the DSRC apparatus according to the first embodiment of the present invention, the mounted position input means 21 and the DSRC apparatus position storing unit 22 are provided as the information setting means in association with the receiving sensitivity setting unit 23 incorporated in the control unit 20. In the DSRC apparatus according to a second embodiment of the present invention, a vehicle information storing unit and a vehicle type information discriminating unit may be provided in place of the DSRC apparatus position storing unit 22 and the receiving sensitivity setting unit 23, respectively.

Figure 3:
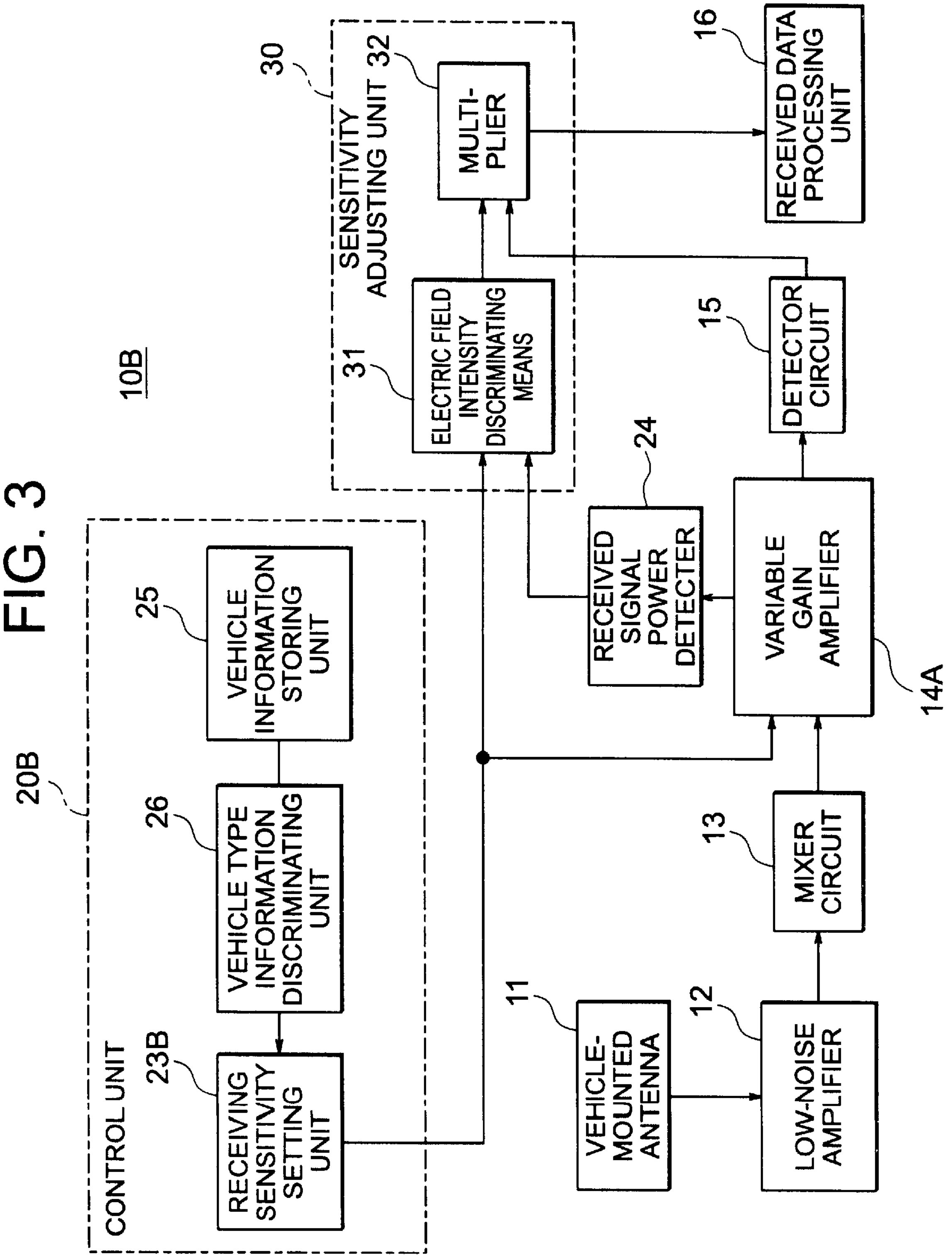
FIG. 3 is a block diagram showing a general arrangement of a vehicle-onboard DSRC apparatus according to a second embodiment of the invention.

FIG. 3 is a block diagram showing generally and schematically an arrangement of the vehicle-onboard DSRC apparatus according to the second embodiment of the present invention in which the vehicle information storing unit and the vehicle type information discriminating unit are incorporated in the control unit 20B. In FIG. 3, components same as those described hereinbefore by reference to FIG. 1 are denoted by like reference characters, while corresponding or equivalent components are designated by like reference numeral affixed with "B", and repeated description of those components will be omitted.

Referring to FIG. 3, a control unit 20B of a vehicle-onboard DSRC apparatus 10B includes a vehicle information storing unit 25 for storing the vehicle information and the vehicle type information discriminating unit 26 for discriminatively deciding the vehicle type or species such as passenger car, motor truck, van, bus and so forth on the basis of the vehicle information, and a receiving sensitivity setting unit 23B for setting the receiving sensitivity in dependence on the vehicle type information decided or discriminated by the vehicle type information discriminating unit 26.

In the following, description will be made of operation of the vehicle-onboard DSRC apparatus according to the second embodiment of the invention.

Upon setting-up of the vehicle-onboard DSRC apparatus purchased, the vehicle type information is loaded in the vehicle information storing unit 25 to be stored therein through the medium of an IC card, as mentioned previously.

The vehicle type information discriminating unit 26 incorporated in the control unit 20B reads out the vehicle information from the vehicle information storing unit 25 to thereby recognize the vehicle type information which is then inputted to the receiving sensitivity setting unit 23B, which in turn sets the desired or optimal receiving sensitivity in accordance with the vehicle type information inputted to thereby control the variable gain amplifier 14A and the sensitivity adjusting unit 30 as described hereinbefore in conjunction with first embodiment of the invention.

More specifically, the receiving sensitivity setting unit 23B determines the optimal receiving sensitivity for the vehicle-onboard DSRC apparatus 10B in conformance with the vehicle type information to thereby drive or activate the variable gain amplifier 14A and the sensitivity adjusting unit 30, as a result of which the vehicle-onboard DSRC apparatus 10B is set to a desired receiving sensitivity.

By way of example, the receiving sensitivity setting unit 23B may be designed to determine the desired receiving sensitivity for the relevant vehicle type by referencing the map data. Alternatively, the motor vehicles may be classified on the basis of the vehicle type and the engine cylinder volume, whereon the receiving sensitivity data may be determined on the basis of the mean or average mounting position for each of the classified motor vehicle types.

The electric field intensity discriminating means 31 incorporated in the sensitivity adjusting unit 30 is adjusted in respect to the sensitivity in response to the input voltage (reference value) from the control unit 20B. Thus, by controlling the output voltage of the D/A converter incorporated in the control unit 20B, the desired receiving sensitivity can be set.

In this case, upon determination of the desired receiving sensitivity, the height H of the position at which the DSRC apparatus is mounted and the distance L mentioned hereinbefore are detected for thereby determining the desired receiving sensitivity by referencing the map data or through arithmetic operation in accordance with the calculation expression (1) mentioned hereinbefore.

As will now be understood from the above, by employing the vehicle information storing unit 25 and the vehicle type information discriminating unit 26, the user of the DSRC apparatus is gotten rid of the burden for manipulating the mounted position input means 21 (refer to FIG. 1) . The receiving sensitivity can automatically be set after the set-up of the DSRC apparatus.

Furthermore, because the sensitivity adjustment is automatically effectuated by means of the receiving sensitivity setting unit 23B on the basis of the vehicle information stored in the vehicle information storing unit 25, the so-called human error can be suppressed, making it possible to adjust the receiving sensitivity with high accuracy.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A vehicle-onboard DSRC (dedicated short-range communication) apparatus, comprising:

an antenna and a control unit for receiving/transmitting information from/to an on-road transport managing equipment installed in association with a road on which motor vehicles are to run; and receiving sensitivity setting means for setting receiving sensitivity of said DSRC apparatus in an area for communication with said on-road transport managing equipment in dependence on vehicle type information indicative of type of said motor vehicle, wherein said receiving sensitivity setting means is designed to compensate for difference of electric field intensity of received radio signals due to different types of said motor vehicles with said receiving sensitivity.

2. A vehicle-onboard DSRC (dedicated short-range communication) apparatus according to claim 1, wherein said vehicle type information includes information concerning at least one of a height of a position at which said DSRC apparatus is mounted on said motor vehicle and a distance between said position and a front end of said motor vehicle, and wherein said receiving sensitivity setting means is designed to set said receiving sensitivity in dependence on at least one of said height of the position at which said DSRC apparatus is mounted and said the distance between said position and the front end of said motor vehicle.

3. A vehicle-onboard DSRC (dedicated short-range communication) apparatus according to claim 1, wherein said receiving sensitivity setting means is designed to set adjustably said receiving sensitivity by referencing map data prepared in advance on the basis of said vehicle type information.

4. A vehicle-onboard DSRC (dedicated short-range communication) apparatus according to claim 3, wherein said receiving sensitivity setting means is designed to perform interpolation arithmetic for said map data.

5. A vehicle-onboard DSRC (dedicated short-range communication) apparatus according to claim 1, wherein said receiving sensitivity setting means is designed to set adjustably said receiving sensitivity on the basis of an arithmetic formula in accordance with the vehicle type information.

6. A vehicle-onboard DSRC (dedicated short-range communication) apparatus according to claim 5, wherein said receiving sensitivity setting means is designed to set limit values of said receiving sensitivity.

7. A vehicle-onboard DSRC (dedicated short-range communication) apparatus according to claim 1, comprising:

an amplifier for amplifying a received signal supplied from said antenna, wherein said receiving sensitivity setting means is designed to set variably an amplification factor of said amplifier in accordance with said vehicle type information.

8. A vehicle-onboard DSRC (dedicated short-range communication) apparatus according to claim 1, further comprising:

a sensitivity adjusting unit for adjusting the receiving sensitivity on the basis of electric field intensity of a received signal received from said on-road transport managing equipment; and a received signal processing unit for processing said received signal in response to an output signal of said sensitivity adjusting unit, wherein said sensitivity adjusting unit includes electric field intensity discriminating means for comparing the electric field intensity of said received signal with a reference value, said receiving sensitivity setting means being designed to setting variably said reference value in accordance with the said vehicle type information, and wherein said received signal processing unit is designed to process said received signal when the electric field intensity of said received signal is equal to or exceeds said reference value.

9. A vehicle-onboard DSRC (dedicated short-range communication) apparatus according to claim 1, wherein said receiving sensitivity setting means includes:

mounted position input means for inputting information concerning a mounted position at which said DSRC apparatus is mounted on said motor vehicle;

a DSRC apparatus position storing unit for storing said mounted position of the DSRC apparatus; and a receiving sensitivity setting unit for setting said receiving sensitivity in dependence on said mounted position of the DSRC apparatus.

10. A vehicle-onboard DSRC (dedicated short-range communication) apparatus according to claim 9, wherein said mounted position input means is comprised of a display device and a ten key array provided in said control unit.

11. A vehicle-onboard DSRC (dedicated short-range communication) apparatus according to claim 9, wherein said mounted position input means is comprised of a display device and an increment key or alternatively a decrement key provided in said control unit.

12. A vehicle-onboard DSRC (dedicated short-range communication) apparatus according to claim 9, wherein said mounted position input means is comprised of voice input means.

13. A vehicle-onboard DSRC (dedicated short-range communication) apparatus according to claim 9, wherein said mounted position input means is comprised of an IC card dedicated for setting up said DSRC apparatus.

14. A vehicle-onboard DSRC (dedicated short-range communication) apparatus according to claim 1, wherein said receiving sensitivity setting means includes:

a vehicle information storing unit for storing vehicle information;

a vehicle type information discriminating unit for discriminatively deciding the vehicle type information on the basis of said vehicle information; and a receiving sensitivity setting unit for setting said receiving sensitivity in accordance with the vehicle type information decided discriminatively by said vehicle type information discriminating unit.

15. A vehicle-onboard DSRC (dedicated short-range communication) apparatus according to claim 1, wherein said control unit is designed to transfer information concerning toll collection with on-road transport managing equipment installed in association with a toll road and serving as an electronic toll collection system, whereby toll collection is performed automaticallly on the basis of the information concerning said toll collection.

* * * * *